Aug. 7, 1934.  W. N. GILBERT  1,969,364
PIVOT BLOCK
Filed Jan. 23, 1931
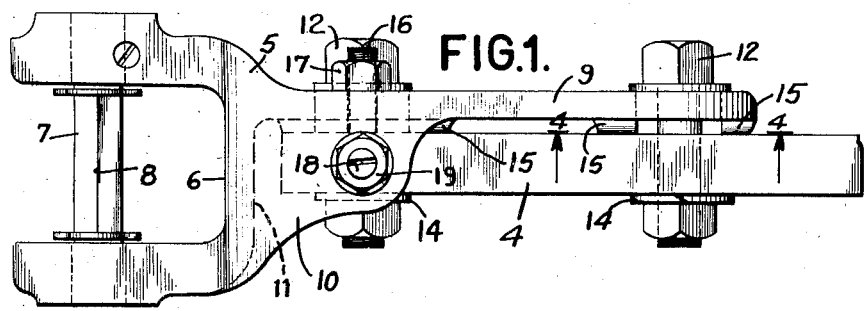
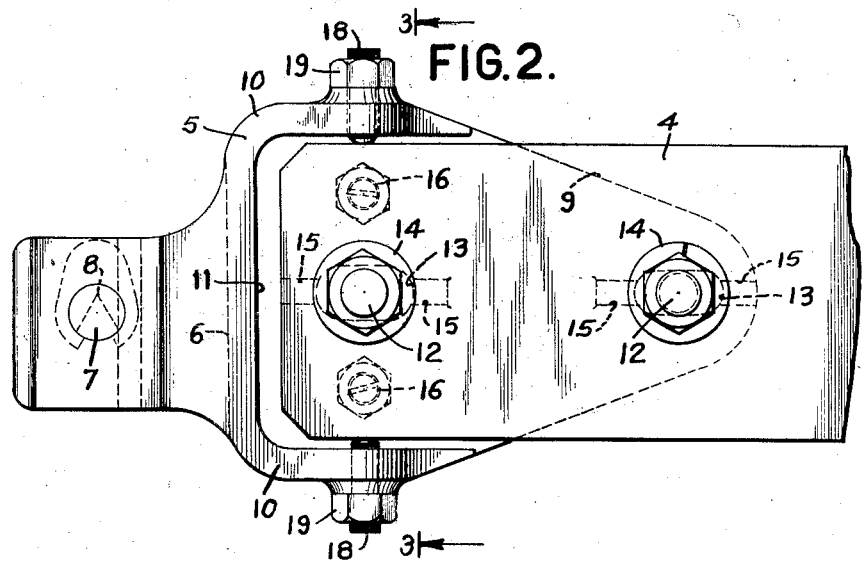
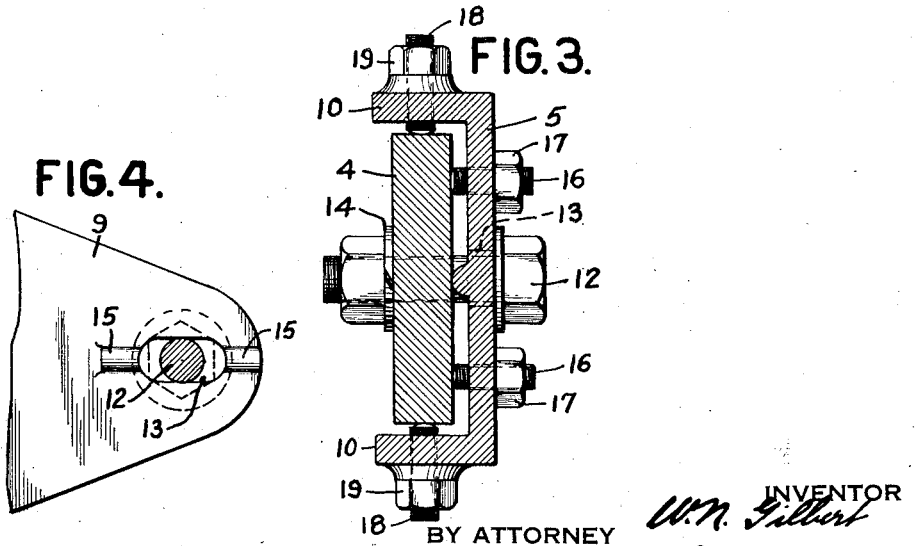

Patented Aug. 7, 1934

1,969,364

UNITED STATES PATENT OFFICE 1,969,364

PIVOT BLOCK

William N. Gilbert, Endicott, N. Y., assignor, by mesne assignments, to International Business Machines Corporation, New York, N. Y., a corporation of New York Application January 23, 1931, Serial No. 510,652

12 Claims. (Cl. 265—49)

The present invention relates to weighing scales in general and particularly to arrangements for adjustably supporting the pivot elements such as the knife edges used in the lever system.

The primary object of the present invention is to provide a novel and improved device for adjustably mounting the pivot elements upon the members of the lever system.

An object is to provide a device for supporting such pivot elements which dispenses with the necessity of using accurately machined levers thereby reducing the cost of manufacture and assembly by permitting the use of comparatively cheap metal bars as levers or beams, the only machining required being the drilling of suitable bolt holes which do not have to be accurately located.

Another object is to provide a device for the purpose described with means for adjusting the pivot element in several directions relative to the lever to which the device is attached, the adjustments permitted being a longitudinal adjustment relative to the lever, adjustments transversely of the lever in two directions at substantially right angles to each other, including an adjustment for leveling the pivot element to place its bearing edge parallel with the bearing edges of other pivot elements which may be carried by the same lever or form part of the lever system.

Other objects, advantages or features of the present invention will be pointed out in the following specification and claims or will be apparent from a study thereof and of the accompanying drawing.

In the drawing:

Fig. 1 is a top plan view of a device embodying the present invention and illustrates the manner in which it is attached to a scale lever or beam.

Fig. 2 is a side elevation of the arrangement illustrated in Fig. 1.

Fig. 3 is a transverse vertical section taken on the line 3—3 of Fig. 2.

Fig. 4 is a vertical section on the line 4—4 of Fig. 1.

The numeral 4 represents a member which may be one of the elements of the scale lever system and may comprise an elongated beam having a general rectangular shape in cross section as illustrated in Fig. 3. The beam 4, as will be shown hereinafter, need not be accurately machined, hence it may be made of a single strip of metal such as cold rolled steel of the requisite length and cross-sectional area. The element 5 is composed of a single unitary structure such as a suitable casting having a bifurcation 6 between the arms of which the pivot element 7 is adjustably supported, the said pivot element having a suitable knife edge 8 adapted to cooperate with a grooved bearing block (not shown) which may be carried by some other member, such as, for instance, a cooperating beam. The element 5 will be hereinafter referred to as a "pivot block" since its function is to adjustably support the pivot element 7.

The pivot block 5 is provided with a vertical portion 9 which is substantially triangular in its general shape and extends to the right longitudinally of and parallel with one side of the beam 4 and is also provided with two lateral, integral, and parallel walls 10 which form a recess 11 in the pivot block 5 adapted to adjustably receive the end of the beam 4. Two bolts 12, passing through elongated holes 13 (Fig. 4) formed in the pivot block 5, serve to clamp the pivot block firmly to the beam 4, simple lock washers 14 being provided to prevent the nuts on the bolts 12 from working loose after the pivot block has once been adjusted and clamped in place. It will be observed that the pivot block 5 as a whole is not in a condition of intimate contact with the side of the beam 4 but is spaced therefrom by ribs 15 formed in said pivot block and extending longitudinally of the beam 4 midway between the upper and lower edges of said beam on each side of the bolt holes 13. The bolts 12 pass through holes formed in the beam 4 which are of substantially the same diameter as the bolts.

It will be clear that the elongated holes 13 permit a certain amount of longitudinal adjustment of the pivot block 5 relative to the beam 4. The ribs 15 provide a pivotal mounting which permits the pivot block 5 to be rocked about an axis extending longitudinally of the beam 4, the right hand hole 13 (Fig. 2) being somewhat larger in diameter than the shank of the right hand bolt 12 in order to permit such pivotal movement, the left hand hole being large enough to permit a small amount of movement of the pivot block 5 laterally of the beam 4 and pivotally about the right hand bolt 12 (Fig. 2) as will be pointed out hereinafter.

In order to control the rocking movement just referred to, the pivot block 5 is provided with two adjusting screws 16, one on each side of the left hand bolt 12 (Fig. 2), said screws being disposed above and below the bolt 12. Suitable lock nuts 17 are provided to securely lock the screws 16 in place after the latter have once been properly adjusted.

The pivot block 5 is also capable of adjustment vertically of the beam 4 and for this purpose there are provided two adjusting screws 18, similar to the screws 16 and similarly provided with lock nuts 19, the screws 18 being threaded in vertical holes in the walls 10 of the recess 11. It will be quite clear that suitable manipulation of the screws 18 will cause movement of pivot block 5 vertically and relative to the longitudinal axis of the beam 4, the left hand hole 13 being large enough to permit such vertical movement.

The purpose of the various adjustments just described in detail will now be explained. An illustration of the use and advantages of the present invention may be had by reference to a commonly known type of scale such as may be used for weighing railway rolling stock, for instance, coal cars, and their loads. The foregoing type of scale is usually called a "track scale" as it is an adjunct to the track system of a colliery or freight yard.

Track scales are provided with lever systems the elements of which comprise beams of large size and weight compared with ordinary scales, consequently it is a difficult problem to accurately machine such beams so that the pivot elements will be properly located, partly owing to the length and weight of such beams, and partly due to the difficulty of securing the requisite accuracy between the centers of the pivot elements. The present invention permits the use of standard steel bars in stock sizes to form the beams, which need not be machined except for the operations of cutting out the holes 13 for the bolts 12, the latter operations requiring merely reasonable accuracy. The slots 13 permit accurate adjustment of the knife edges of the various pivot elements of a beam between centers and are particularly advantageous in securing the correct ratios necessary between the various arms of the levers. The vertical adjustment effected by the screws 18 permits the various knife edges of a beam to be very accurately positioned at the desired height. Usually they are set to a common height. The adjusting screws 16 provide for accurate alining or leveling of said knife edges with the cooperating bearing blocks or setting them parallel with each other.

It is apparent that the present invention effects a considerable saving in time and labor since it greatly reduces the amount of accurate machining necessary and at the same time permits greater accuracy of adjustment of the pivot element. The pivot block 5, being small in size compared to the lever to which it may become attached, may be handled with ease and can be readily machined within very close limits of accuracy. It will be obvious, however, that the pivot block 5 requires comparatively little machining calling for great accuracy other than the surfaces of said pivot block carrying the pivot element 8 since all of the parts of said block in contact with the scale beam may be easily adjusted relative to the latter.

The present invention, for purposes of illustration only, has been shown and described as embodied in a specific form, however, it will be understood that it may be modified as to form or arrangement in order to meet different conditions found in practice, therefore it is not desired to limit the invention to the precise form illustrated and described.

I claim:

1. In combination with a scale beam, a pivot element, and means for adjustably mounting said pivot element on the scale beam comprising a member adapted to support said pivot element and having a pivot edge in contact with the side of the scale beam, said pivot edge extending longitudinally of the latter, means for holding the pivot edge in contact with the scale beam, and means for adjustably rotating said member about said pivot edge to thereby rotate said pivot element about an axis longitudinal of the scale beam.

2. In combination with a scale beam, a pivot element, means for mounting said element upon said beam comprising a unitary structure having a recess adapted to receive said beam and having a rib extending longitudinally of said beam, means carried by the side walls of said recess for adjusting said structure transversely of said beam; means for adjusting said structure relative to said beam by a pivotal movement about said rib; and means for rigidly attaching said structure to said beam and adapted to permit adjustment of said structure longitudinally relative to said beam.

3. In combination with a scale beam, a pivot element, and means for adjustably mounting said element upon said scale beam comprising a unitary structure having a portion for supporting said pivot element and a portion extending parallel with the longitudinal axis of the scale beam, said last named portion having a longitudinal rib permitting pivotal movement of said structure about an axis longitudinal of the scale beam whereby the pivot element may be leveled, and means for adjusting said pivotal movement to level said pivot element.

4. In combination with a scale beam, a pivot element, and means for adjustably mounting said pivot element upon the scale beam comprising a member adapted to support said pivot element and having a pivotal connection to said scale beam permitting said member to be rocked about an axis longitudinal of the scale beam, and means for adjustably rocking said member.

5. A device for mounting a pivot element upon a scale beam comprising a member adapted to support said element and adapted for pivotal movement relative to the longitudinal axis of the scale beam, means for adjustably controlling said pivotal movement, and means for attaching said member to the scale beam and adapted to permit adjustment of said member longitudinally of the scale beam.

6. In combination with a scale beam, a pivot element, a member carrying said pivot element, a plurality of pin and slot connections between said beam and said member permitting longitudinal adjustment of the member relative to the beam, one of said pin and slot connections being loose whereby a rotative movement about another of said pin and slot connections may be obtained, means for adjustably actuating the member to rotate about the last named pin and slot connection, and means for holding the member in adjusted position.

7. In combination with a scale beam, a pivot element, a member carrying said pivot element, a plurality of pin and slot connections between said member and said beam permitting longitudinal adjustment of said member relative to said beam, means for clamping said member to said beam to retain the latter in longitudinally adjusted position, and adjusting screws carried by the member and engaging opposite sides of the beam to prevent the member from moving transversely of the beam.

8. In combination with a scale beam, a pivot element, a member for carrying said pivot element, a plurality of pin and slot connections between said member and the beam permitting longitudinal adjustment of the member relative to the beam, one of said pin and slot connections being loose to provide for rotational movement of said member about another of said pin and slot connections as a pivot, means carried by the member for providing a micrometer adjustment for said rotational movement, and means for holding the member in longitudinally adjusted position.

9. In combination with a scale beam, a separately formed carrier mounted on the beam for adjustment in at least two directions relative to the beam and bearing a pivot portion extending exteriorly of the beam to form a longitudinal extension thereof.

10. In combination with a scale beam, a carrier mounted on said beam and provided with connections to the beam to permit a coarse adjustment of the carrier longitudinally of the beam, and a knife edge pivot element mounted in the carrier for longitudinal adjustment of the knife edge to a degree relatively finer than the adjustment permitted by said connections whereby to permit two different degrees of adjustment of the knife edge longitudinally of the scale beam.

11. In combination with a scale beam, a pivot element, a carrier for the pivot element having a recess partly surrounding the end of the beam to permit removal of the carrier in a direction transverse to both the line of action of the pivot element and the longitudinal axis of the scale beam, and means carried by the walls of the recess for removably and adjustably mounting the carrier on said beam.

12. In combination with a scale beam, a carrier having a portion formed as a socket to loosely receive the end of the scale beam, said carrier being adapted to support a pivot element, and connections between the walls of the socket and the end of the scale beam to permit limited universal adjustment of the carrier relative to the scale beam.

WILLIAM N. GILBERT.